INVENTOR
LEWIS BALAMUTH
BY
Leonard W. Suroff
ATTORNEY

INVENTOR
LEWIS BALAMUTH
BY
Leonard W. Suroff
ATTORNEY

United States Patent Office 3,438,824
Patented Apr. 15, 1969

3,438,824
METHOD AND APPARATUS FOR JOINING A CLOSURE TO A CONTAINER BY HIGH FREQUENCY RADIAL VIBRATIONS
Lewis Balamuth, New York, N.Y., assignor to Cavitron Corporation, a corporation of New York
Filed May 14, 1965, Ser. No. 455,928
Int. Cl. B32b 31/20
U.S. Cl. 156—69                              22 Claims

ABSTRACT OF THE DISCLOSURE

A method and appartus for joining a cylindrical element to a second element, wherein at least one of the elements is a thermoplastic. The two elements are positioned in an overlapping relationship and high frequency radial forces are applied to the overlapped surface to effect a joinder of the elements.

---

This invention relates generally to the joining of materials with high frequency radial vibrations and more particularly to an improved method and apparatus for fabricating containers from similar or dissimilar materials.

In recent years, there has been a great increase in the use of thermoplastic film or thin sheet as a packaging material and as a liner in containers. The great increase in the use of these materials for packaging is due to the fact that the package can be made fluid-tight to thus enclose the packaged article to prevent the entrance or exit of moisture from the package or container. This fluid-tight feature is a result of the fact that certain thermoplastic films are inherently moisture-tight, and in view of their thermoplastic nature, can be ultrasonically sealed to make a moisture-tight seal. In view of these marked advantages of thermoplastic film over other packaging material, there has been great activity in the art of sealing thermoplastic film material with the use of ultrasonic energy.

Plastic sealing with ultrasonic energy has been growing rapidly in importance, not only in the packaging field but also in other areas as well. The art of sealing two plastic surfaces together by applying ultrasonic vibrations perpendicular to those two surfaces by means of an applied longitudinally vibrating tool is by now well known. In fact, it must be appreciated that sheer vibrations are readily absorbed by thermoplastic materials and hence will not transmit well. This is the basic reason for employing compressional waves to do the sealing when the vibrations must travel through the thermoplastic material in order to get to the desired sealing location.

Most existing ultrasonic joining or sealing devices generally comprise a generator producing an alternating current with a frequency that is in the ultrasonic range, a transducer preferably of the magnetostrictive type, which converts the high frequency electrical output of the generator into a high frequency longitudinal mechanical vibration or compressional wave, and a member or tool connected to an end of the transducer and being operative to transmit the vibrations longitudinally therethrough. The tool is vibrated in the direction of the longitudinal axis of the transducer, and the sheet material to be sealed is positioned between and in contact with the working surface of the tool and a hard surface or anvil positioned in a plane perpendicular to the longitudinal axis of the tool.

In the bonding or joining together of thermoplastic sheet material through the use of devices of the type described above, the tool is vibrated perpendicular to the planes of the two films or sheets being joined, that is, in the direction of the longitudinal axis of the transducer, to obtain the repeated compressing of the thermoplastic material at the indicated ultrasonic or high frequency and thereby generate heat internally within the thermoplastic materials so that fusion therebetween results without affecting substantial areas of the sheet materials adjacent with the joint. Although the above method and ultrasonic equipment has found acceptance and use for sealing of thermoplastic materials, it is substantially limited to the sealing of flat surfaces.

A major disadvantage of the prior art systems for ultrasonic joining is that they are limited for use in operations where it is not required that any substantial arc or curvature in the plane of the longitudinal vibrations is required. If a seal requiring a substantial curvilinear distance and wherein said linear distance is in the plane of the longitudinal vibrations, it has been heretofore impossible to obtain said seal without rotation or relative movement between the tool and the surfaces to be joined.

The primary object of the present invention is improved methods and apparatus for the sealing or joining of materials.

A further object of the invention is to provide improved methods and apparatus for the joining of materials utilizing radially directed ultrasonic vibrations.

Yet, another object of this invention is to provide an improved method of affecting the joinder of relatively thin sheet material by the application of high frequency radially directed vibrations.

An additional object of this invention is to provide improved apparatus to permanently joining thermoplastic materials having a predetermined shape.

In accordance with an important aspect of the present invention, it is possible to seal surfaces that have a substantial curvilinear arc in the plane normal to the longitudinal vibrations. For small curvatures, it is sufficient to curve the output of the blade sealing element, because the angle of incidence of the compressional waves into the plastic will not become so great as to cause considerable sheer energy to be introduced at the plastic surface. As soon as such sheer energy becomes significant, the surface of the plastic, which is not to be sealed, overheats and undesirable distortion results, and the ability to get the ultrasonic energy to the sealing site itself diminishes.

When the curvature of the surfaces to be sealed is large, we can no longer rely on longitudinal vibrations, except in the special case when the longitudinal vibrator output is reduced to a very small area, approximately a point. Then, of course, the tool may be made to traverse any path while being oriented so as to provide compressional waves in the plastic wherever said tool is applied. But, this invention foresees these difficulties and removes them all, by providing a curvilinear surface, every point of which in the sealing region desired vibrates substantially perpendicular to the tangent to the surface at that point. It will be appreciated at once that such motion is not possible through simple longitudinal vibrations. Instead recourse must be had to a characteristic mode of vibration of the tool being used, such that the above perpendicularity criterion of vibration is maintained. One simple example of this kind of tool is one shaped in the form of an annular disk. Such a tool is described in Patent No. 3,093,937, assigned to the present assignee, and wherein the present applicant is a co-inventor. The tool may be readily vibrated by means of a longitudinal vibrator attached thereto, in its fundamental radial vibration mode. In this case, every point on the outer and inner circumference of the annular tool will execute high frequency vibrations which at each circumferential point are radially directed (i.e., perpendicular to the tangent to the circumference at that point).

In accordance with the present invention, the materials to be joined are supported in contact with each other in the area of the joint and ultrasonic energy applied thereto. Although the vibratory energy is applied substantially perpendicular to the surfaces to be joined, they are so directed from a radially vibrating tool member.

The vibrations are applied to the surfaces to be joined by a tool having opposed substantially flat parallel surfaces with the vibrations having significant components in the planes of such tool surfaces. The tool is in the form of a circular ring which is vibrated radially at a high or ultrasonic frequency and with an amplitude that is uniform about the entire inner and outer circumference of the ringer. Either the inner or outer surfaces of the tool may be utilized as the vibratory surface to perform the sealing operation with.

In accordance with one embodiment of this invention, the above described apparatus is used for joining two members, each having an annular cross-sectional area and wherein a portion of said cross-sectional areas are placed in overlapping relationship with each other and vibratory energy is introduced in a direction radially thereof for joining the two members without the rotation of either the ultrasonic tool or the members.

Thus, the novel method and apparatus of the present invention permits the sealing of two tubular members by overlapping a portion thereof and introducing vibrations radially thereof. The vibrations in essence are in the plane substantially normal to the surfaces to be joined and accomplish the ends without detraction from the general advantages that accrue to well-known ultrasonic sealing methods.

It will be noted that this method of joining in accordance with this invention may be utilized in the assembling of drinking cups, either of the vending type adapted to be used in coin controlled drink vending machines, or of the non-vending type adapted to be packaged and sold in stores or for packaging ice cream or containers for other foods. In the assembly or manufacture of containers, it is desirable to obtain a fluid tight seal between the body or shell of said container and the closure or cover member. Containers, and particularly drinking cups, normally consist of a tubular body and a closure or bottom that is positioned within and secured to the latter by an annular peripheral flange depending from the closure and extending parallel to the body of the container. The material from which these containers are fabricated is either of solid plastic, plastic coated paper, paper or any combination thereof.

It is possible to seal the entire periphery of a tubular member having an annular cross-sectional area to an end closure that may have an annular peripheral flange extended parallel to the wall of the tubular member by positioning said annular surfaces in contact with each other, and applying the above mentioned radially directed mechanical vibrations to one of said members.

In accordance with another embodiment of this invention, the above described method is used for joining two substantially solid members. The sealing surfaces of the two members may be of any desired configuration and need not have their entire sealing surfaces in contact with each other. The basic criteria that must be followed is that the surface configuration of the member to be brought in contact with the radially vibrating member, which has an annular sealing surface, must also have a substantial annular surface to assure proper transmission of said energy therethrough to the interface of the members in their area of contact. This will assure the transmission of a sufficient amount of energy to effect a proper joinder of the members.

In accordance with yet another embodiment of the invention, the radially directed high frequency mechanical vibrations may be imparted to the inner positioned member as well as the outer positioned member to effect the joinder of the two at their area of overlap. This method of joining is accomplished by providing a radial vibrator having an outer annular sealing surface which is caused to engage the inner positioned member to impart said vibrations in a plane substantially perpendicular to the area of overlap of said member.

Further objects, features and advantages of the present invention will become more apparent from the following detailed description thereof, when taken in conjunction with the accompanying drawings, in which.

Figure 1:
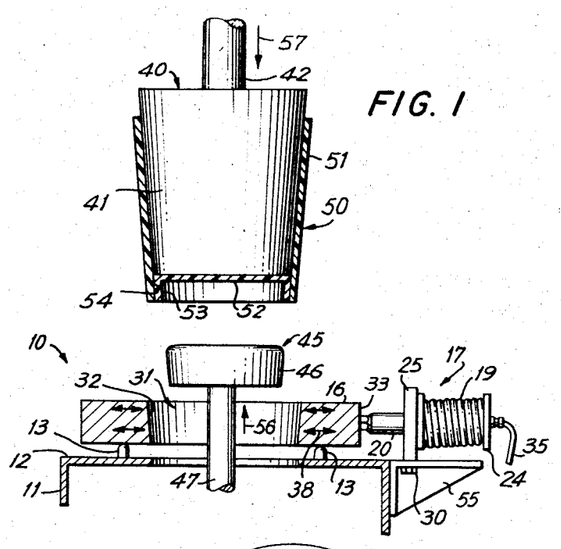
FIG. 1 is a vertical sectional view of an ultrasonic device embodying the present invention for joining the overlapping surfaces of thermoplastic members, which view is taken along the line 1—1 on FIG. 2.
Figure 2:
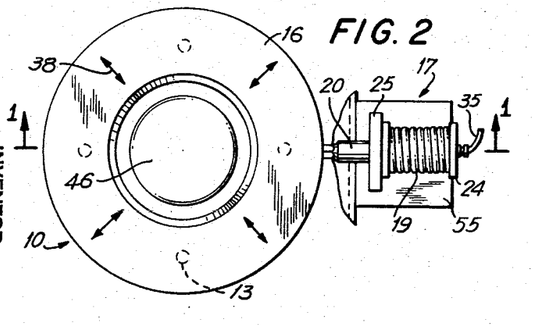
FIG. 2 is a top plan view of the device of FIG. 1.

Referring now to FIGS. 1 and 2, there is illustrated therein apparatus according to the invention for joining of materials, at least one of which is thermoplastic. As indicated by the cross hatching in FIG. 1, the materials illustrated are of plastic, but it will be realized that the sheets to be joined may be of any thermoplastic material or materials capable of coalescing to form a bond therebetween. It will also be understood, that only one of the materials need be of this character, the other sheet, for example, being of a porous material into which the fusable material will penetrate. However, for the purpose of the explanation of the figures to follow, it will be assumed that the apparatus is working with plastic materials.

The basic structure for the joining of thermoplastic material embodying the present invention is illustrated in FIGS. 1 and 2 and there generally identified by the reference numeral 10 which may include a housing 11 having an upper plate 12 extending horizontally thereacross for support of the ultrasonic sealing equipment. A circular ring 16 constituting the sealing tool of the equipment 10 is disposed immediately above the upper plate 12. The circular ring 16 is made to vibrate radially, as hereinafter described in detail, by means of a vibration generating unit 17.

Figures 13, 14, 15, 16:
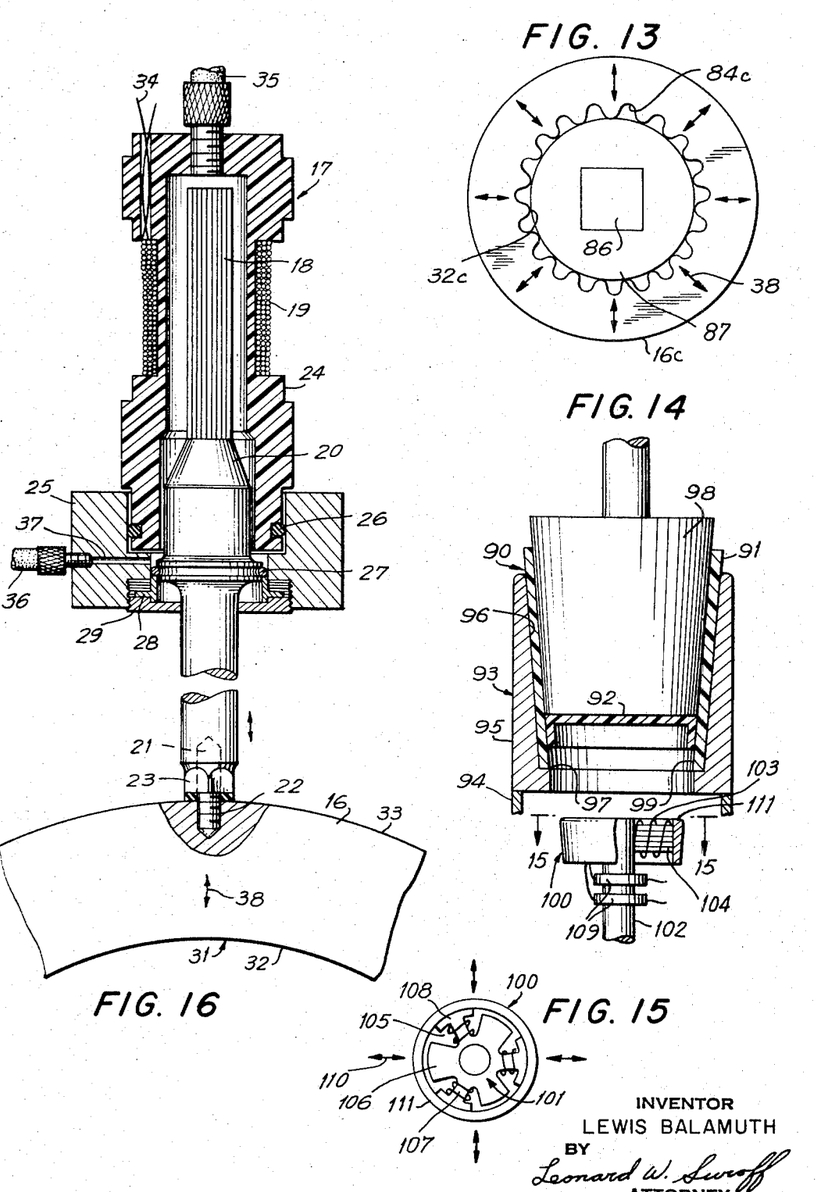
FIG. 13 is a view similar to that of FIG. 10, but having a pattern of grooves at substantially right angles to the sealing surface thereof.
FIG. 14 is a vertical sectional view of an ultrasonic device illustrating another embodiment of the invention.
FIG. 15 is a top plan view of a radially vibrating member, which view is taken along the line 15—15 of FIG. 14.
FIG. 16 is an enlarged axial sectional view of the unit for effecting radial vibration of the circular sealing ring in the device of FIGS. 1 and 2.

As shown on FIG. 16, the vibration generating unit 17 includes a transducer 18 which is made to vibrate at high frequency and low amplitude when subjected to the influence of a corresponding high frequency alternating magnetic field generated by a surrounding winding 19. The longitudinal vibrations thus induced in transducer 18 are transmitted through a connecting body 20 to the ring 16. The body 20 is preferably shaped, formed and designed as an acoustic impedance transformer, that is, to act as a vibration amplitude magnifier so that the amplitude of the vibrations transmitted radially from transformer 20 to ring 16 is substantially greater than the amplitude of the vibrations received from the transducer 18. As explained in greater detail in U.S. Letters Patent No. Re. 25,033 issued Aug. 14, 1962, to the assignee of the present application, the input portion of body 20 may have a greater mass than the output portion thereof in order to obtain the desired magnification of the vibration amplitude.

The transducer 18 may be any one of a number of electromechanical types, such as, electrodynamic, piezoelectric or magnetostrictive. The operating frequency may be in the higher sonic or ultrasonic ranges, but preferably is of the order of 10,000 to 100,000 cycles per second. At these preferred frequencies, a transducer 18 of the magnetostrictive type is most desirable. The transducer 18 may be formed of a stack of plates or laminations of a metal, such as, nickel, Permanickel, Permendur, or other metals which have high tensile strength and are highly magnetostrictive in character, so that the transducer will longitudinally vibrate to a maximum degree when subjected to the influence of an alternating magnetic field established when biased alternating current is supplied to the winding 19 in surrounding relation to the transducer.

The transformer or connecting body 20 is rigidly secured at the input end thereof to the transducer 18 by brazing, silver solder or other permanent fastening means. The other or output end of transformer 20 may be provided with a threaded bore 21 for receiving a mating stud 22 which projects radially from the outer periphery of ring 16 and constitutes the means for connecting the vibration generating unit 17 to the sealing ring. The output end of transformer or connecting body 20 may be provided with a polygonal cross section, as at 23, to receive a wrench or the like by which the transformer may be tightened on the stud 22.

The magnetostrictive transducer 18 and the input portion of the transformer or connecting body 20 are contained within a generally tubular casing member 24 of nylon or similar non-conductive, liquid impervious material that will not interfere with the magnetic field set up by the winding or coil 19 wound thereon. The end of tubular casing member 24 from which transformer 20 projects is retained within a mounting block 25, for example, by means of set screws (not shown) in the block, and a fluid-tight seal is provided therebetween by means of a sealing ring 26. The transformer or connecting body 20 is also mounted in the block 25 by means of a flexible sealing ring 27 retained in a suitably provided groove in the exterior surface or periphery of body 20. The ring 27 is preferably disposed at a nodal point of the longitudinal vibrations transmitted through body 20, which nodal point is approximately midway between the ends of the body 20 when the latter has a preferred length equal to an integral number of half wavelengths of the vibrations or standing compressional waves developed therein at the operating frequency. Further, the sealing and mounting ring 27 is secured against a cooperating shoulder within the block 25 by means of a retaining ring 28 held in position by a thread plug 29. The block 25 is secured, as by bolts 30 (FIG. 1), to a bracket 55 extending outwardly from a side wall of housing 11 so that the axis of vibration generating unit 17 is directed horizontally.

To achieve most efficient operation of the vibration generating unit 17, the transducer 18 and the connecting body or transformer 20 are each formed with a length equal to an integral number (preferably 1) of half wavelengths of sound in the respective materials thereof at the desired frequency of vibration. Suitable alternating current to effect vibration of the transducer 18 is supplied to the winding 19 through wires 34 (FIG. 16) extending from a suitable alternating current generator (not shown).

Since heat is generated when vibrations are induced in the transducer 18 and the most efficient operation of the latter is obtained when the overheating thereof is avoided, a gaseous or liquid coolant is preferably continuously supplied to the interior of the tubular casing member 24 by way of a conduit or tube 35 opening into the end of the casing member remote from mounting block 25. The return for the coolant is provided by means of a tube or conduit 36 communicating with a duct 37 formed in mounting block 25 and opening into the annular space defined between connecting body 20 and casing member at a location intermediate the sealing rings 26 and 27.

The sealing ring 16 is preferably formed from a solid circular block of material capable of efficiently transmitting the vibrations, such as monel, aluminum or magnesium alloy, and bronzes. The ring 16 is formed with a circular hole 31 having an annular peripheral surface 32 which may be contoured to conform to the taper of the container to be assembled in the center thereof, and preferably has an outer diameter and inner diameter which are selected, as hereinafter described in detail, so that the longitudinal vibrations occurring at the output end of connecting body 20 of unit 17 and transmitted radially into ring 16 at one point on the outer periphery 33 of the latter are effective to cause radial vibration of ring 16 uniformly around the entire inner and outer circumference of the latter, with a loop of such radial vibrations occurring adjacent the outer periphery of the sealing ring. Such radial vibrations occur substantially in a horizontal plane and cause the ring 16 to be diametrically expanded and contracted during each vibrational cycle.

The sealing ring 16 is preferably supported in such a manner that its annular sealing surface 32 lies in a common plane substantially normal to the axis of the container body and that only a minimum damping of the radial vibrations 38 occurs in said ring. A suitable mounting of the sealing ring is illustrated in FIGS. 1 and 2 and wherein the sealing ring 16 is suitably supported on the plate 12 of housing 11, for example, by four equally, angularly spaced apart mounting blocks 13 which are designed to avoid damping of the radial vibration of the ring, for example, by being formed of a flexible material, such as rubber, and by being disposed adjacent a node or nodes of the radial vibrations of ring 16.

The sealing equipment 10 further generally includes an upper support means 40 and a lower support means or tool 45 and may be acuated (by means not shown) so as to engage and support the container to be assembled during the joining operation. Other means for supporting the container during the joining operation may be used without departing from the scope of the present invention.

The upper support means 40 comprises a mandrel or male plug 41 which is generally frusto-conical in configuration and a shaft 42 secured to one end thereof to support and control the vertical movement of the mandrel 41 during the assembly process of the container.

The lower support means 45 comprises a disk 46 which acts as a back-up member and may have a generally frusto-conical shape to co-act with the taper of the mandrel 41. The disk 46 is rigidly secured to and supported by shaft 47 and is of a smaller diameter than the annular opening 31 of disk 16 to permit passage of said disk therethrough. The lower and upper support means 40 and 45 respectively, are positioned in axial alignment with each other and in co-axial alignment with the sealing ring 16 to assure proper sealing of the entire periphery.

Prior to the joining operation illustrated in FIGS. 1, 2, 3 and 4, the manufacture of the container has progressed to the positioning of a cup or container 50 on the mandrel 41 of the upper support means 40. The cup 50 is comprised of a shell or body 51 and a closure or bottom 52 which is provided with an annular depending peripheral flange portion 53 that is adapted to fit snugly within the adajacent edge portion 54 of the shell 51 for joining thereto.

It should be understood that the method of positioning and removing the container 50 from the mandrel 41 may be carried out by any number of conventional mechanisms presently available and as such is not a part of the present invention.

In the sealing equipment illustrated in FIGS. 1 through 4, only one station of a container manufacturing machine is illustrated. Reciprocal tools are provided at each station in the known manner to successively perform various operations on the container being formed as it rotates from one station to the next. Because these other stations are not concerned, per se, with the present invention, it is not necessary to comment on them.

Thus, we are concerned with the station in which the bottom of the container is joined to the body thereof. The sequential operation of the apparatus in a joining cycle in general comprises placing the cup 50 which is positioned on mandrel 41 of upper support means 40 in spaced relation to the lower support means 45 while said support means are initially positioned above the sealing ring 16 as shown in FIG. 1. The lower support means 45 is then moved upward, as illustrated by arrow 56, so that the support disk 46 is in the position shown in FIG. 3.

Figure 3:
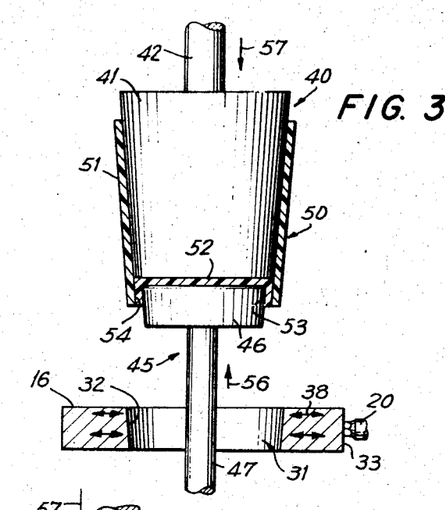
FIG. 3 is a view similar to that of FIG. 1, wherein a support member has been moved axially into the overlapped area of the thermoplastic members.
Figure 4:
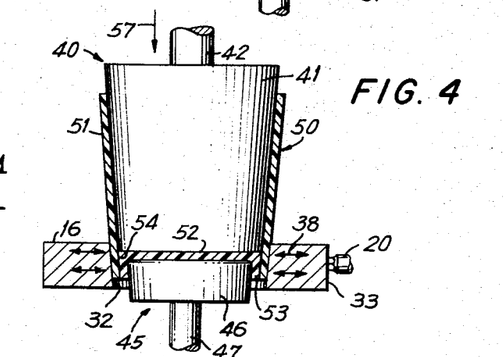
FIG. 4 is a view similar to that of FIG. 1, wherein the overlapped area of the thermoplastic members have been brought into operating relation with the sealing surface of a radial vibrator.

The purpose of the support disk 46 is to retain the thin walls of the container in a desired position and in contact with each other when the outer periphery of the shell 51 is brought into contact with the sealing surface 32 of ring 16 and to maintain said periphery under pressure on said sealing surface during the sealing operation. Thus, the support disk 46 acts as a support pressure member and as an anvil in the same manner as the anvil or back-up plate is often utilized in bar sealing of thermoplastic materials. It should be pointed out that the utilization of an anvil is only required when the particular thicknesses of the materials to be joined are relatively thin and require the support of a back-up member. The structural strength of the thinnest cylindrical or annular portion of both members and its relation to the sealing surface 32 will determine the necessity of a back-up plate or anvil as illustrated in FIGS. 1, 3 and 4. Further, in certain applications, the anvil acts as a heat sink to aid in drawing off the heat introduced at the surfaces to be joined by the ultrasonic energy imparted to the container 50 from the vibrating ring 16.

Thus, the disk 46 is raised as indicated by arrow 56 to engage the annular depending flange 53 of the bottom of the cup 52. After engagement of the lower support means 46 in the position as shown in FIG. 3, both the upper support means 40 and the lower support means 45 are moved vertically downward, as indicated by arrow 57, so as to permit the positioning of the container 50 in the position as shown in FIG. 4.

The vibratory energy may be maintained within the tool 16 at all times, or in the alternative, the vibratory energy may be imparted to the ring 16 on a specific duty cycle. It is sometimes desirable to maintain a duty cycle, for example, 50%, so as to avoid unnecessary wear and tear on the component parts of the ultrasonic system and to permit the overlapped surfaces to come to rest on the ring 16 prior to the introduction of vibratory energy thereto. A 50% duty cycle is one in which the generator and, in turn, the transducer is energized for one-half of a given period of time, for example, a quarter-of-a-second on during which time there is energy being transmitted to the vibratory tool 16 and then a dwell time in which neither the transducer 17 or generator is being energized. In the interim of time when no energy is being imparted to the tool, the cup is then transported on the mandrel 41 to the next work station, and the next cup is then positioned in place for the sealing operation.

It will be observed that, when the support disk 46 is positioned within the end cap 52 of the container 50 (FIG. 3), the upper support means 40 and the lower support means 45 remain in axial alignment with each other, and with the annular opening 31 in the sealing ring 16. It may be desirable to provide the disk 46 with a taper on its periphery which is the same in contour as that of the mandrel 41.

If the thicknesses of the annular depending peripheral flange 53 of the closure 52 of the cup 50 and the shell 51 are of relatively thin material, then a corresponding taper of the disk may not be required. Thus, it is possible under certain conditions to have the annular surface 32 of the ring 16 parallel with the outer surface of the ring 33. When this type of design is utilized, although the mandrel 41 may still have a taper, as illustrated in FIG. 1, the depth of penetration of the cup into the sealing ring 16 is sufficiently small to permit the momentary expansion of the closure flange 53 and body 51 at their overlapping area so as to eliminate the necessity for a taper in the disk 46 and ring 16.

The depth or width of the seam or seal produced may be controlled by varying the thickness of ring 16 or it may be desirable to synchronize the upper and lower support means 40 and 45, respectively, so that the surface areas of the container to be joined is positioned within the ring by a predetermined distance. This will permit the maintaining of a seal having a specific width.

When the container and both support assemblies are nested within the annular opening 31 of sealing ring 16, the area to be sealed is in intimate contact with the sealing surface 32 of said ring.

In the position as shown in FIG. 4, the entire circumference of the body 51 may be joined at its interface 54 to the annular depending flange 53 of the cup closure 52. As previously indicated, by the utilization of a radially vibrating ring, it is possible to maintain compressional waves on the plastic surface so as to insure that a complete seal is obtained over the entire overlapped area of the members being joined. Thus, by providing a curvilinear surface in the form of a radially vibrating ring on which every point vibrates substantially perpendicular to the tangent of the point on the surface being joined, desirable vibratory motion is obtained. It will be appreciated at once that such motion is possible only by the utilization of a radially vibrating member and that sheer vibrations or vibrations in a plane other than substantially perpendicular to the surfaces to be joined is maintained at a minimum, thereby making it possible to obtain a proper waterproof seal at the sealing site.

The length of time the container 50 will remain in the position as shown in FIG. 4 will be dependent upon the thicknesses of the thermoplastic materials to be joined and the amplitude of vibration of the radially directed motion in the ring 16 as illustrated by arrows 38 as shown in FIGS. 1, 3, 4 and particularly in FIG. 2. The application of the vibratory energy to the members to be joined results in vibrating the molecules of the material at the frequency of vibration imparted thereto. While the exact theory to explain this phenomenon is not known for certain, it is believed that the vibratory energy imparted to the outer surface of the members to be joined causes the molecules to vibrate, and as a result of this vibratory energy, rapid heating of the contacting surfaces to be joined occurs. In accordance with this theory, the application of vibratory energy to the outer surface of body 51 causes vibration of the molecules thereof and resulting heating of the area of contact of the annular surface 54 with the flange 53 of the container closure 52. The heating will extend over the entire peripheral area of contact of the body 51 with the surface 32 of ring 16, and accordingly, the resultant seal will be effected over the complete area of overlap of the peripheral flange 53 and body 51.

The sequence of the operations as illustrated in FIGS. 1, 3 and 4 may be varied without departing from the scope of the process of joining two thermoplastic bodies as disclosed in the present invention. The upper and lower support mechanisms 40 and 45 respectively, may be powered by any means, for example, an air or hydraulic cylinder or any other actuating means that is desirable for the particular sealing operating to be performed. It is also possible to have the lower supporting mechanism 45 spring mounted so that only the upper supporting means 40 need be moved downwardly or upwardly to the various positions as shown in FIGS. 1, 3 and 4. By spring mounting the lower retaining mechanism 45, it is possible to force the mandrel 41 with the cup 50 positioned thereon downwardly onto the disk 46 and positioned as illustrated in FIG. 4.

The primary purpose of having the lower mandrel 46 inserted within the lower cup portion 53 prior to the insertion of the entire assembly within the radially vibrating ring 16 is in that certain processes in which there is no duty cycle, as previously discussed, the energy is transmitted the instant there is physical contact between the outer periphery of shell 51 and the inner peripheral surface 32 of the ring 16. Thus, because of this almost instantaneous transfer of vibratory energy into the container, it is necessary that the back-up member be in position when said energy is transmitted. In this manner, the entire assembly moves in unison into the vibrating ring and the bodies are maintained in physical contact with one another. In contrast to this, if the members are of a relatively thick material, it is possible to eliminate the lower support member 45 so that there be only an upper assembly 40.

Although the upper supporting means 40 has been shown singularly, it will be appreciated that said supporting means may be only one of a plurality positioned on a rotating member and that the assembly process illustrated in FIGS. 1, 3 and 4 are merely one work station in the manufacturing of a complete container. Thus, while at this particular work station, the bottom or closure of a cup is being secured to its shell or body, at another work station, there may be the forming of the shell while at a subsequent work station, the upper and lower edges of the cup are being rolled over.

It has been found that, for various sealing operations, it becomes desirable to provide a lower support means that is capable of having an adjustable outer periphery. The diameter of the lower support is adjusted when either the material from which the container is fabricated is of a different thickness or of a different material requiring a greater pressure at the mating surfaces in the sealing zone.

Thus, the use of an adjustable support permits the operator of the equipment to avoid the necessity of changing the lower support for various container seals as well as material thicknesses. In this manner if the support, for one reason or another, tends to change in diameter a quick adjustment by the operator would guarantee the continuance of obtaining proper consistent seals on the container being fabricated.

Figure 5:
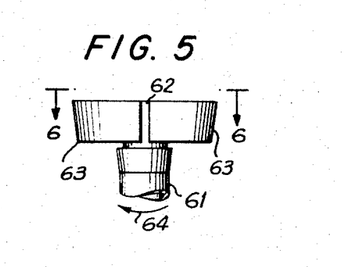
FIG. 5 is an elevational view illustrating an alternate type of support member suitable for use in the apparatus of FIG. 1.
Figure 6:
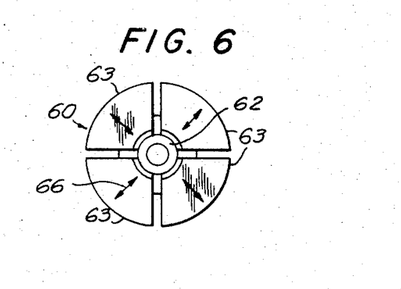
FIG. 6 is a top plan view of the support member, which view is taken along the line 6—6 of FIG. 5.

A modification of the lower support means 45 is shown in FIGS. 5 and 6. As opposed to the integral construction of the disk 46 of FIGS. 1, 3 and 4, the support means as illustrated in FIGS. 5 and 6 is fabricated in separable sections to permit radial expansion and contraction. The variable support means 60 includes spindle 61 and a tubular shank 62 centered in axial alignment and rigidly secured thereon to the spindle 61. Two or more collets 63 are adjustably secured to the shank 62 and may be radially expanded and contracted as illustrated by arrows 66.

The entire assembly may be mounted in similar fashion to the disk 46 as illustrated in FIGS. 1, 3 and 4. The adjustable collet 60 would then be varied in diameter by proper adjustment of any mechanical linkage (not shown) that is known in the art.

In view of the fact that there is a minimum gap between each collet 63, it might be desirable to oscillate the entire support means 60 in the direction as indicatetd by arrow 64 during the joining operation. This might be a mere oscillation of anywhere from $\frac{1}{16}''$ to $\frac{1}{4}''$ depending upon the diameter of the mandrel and the particular thickness of the members being sealed. If the members are sufficiently thick and the slot is quite small, it might not be necessary to oscillate or rotate the support means 60 at all. The reason for this is that sufficient heat is generated at the interface of the mating surfaces to flow into the adjoining area not in contact with the vibrating ring.

When joining thermoplastic materials, there are several variables that must be considered one of which is the amount of power required to make a seal. This will depend upon the size of the parts, the contact area of the abutting surfaces to be joined, and the type of plastic selected. The variables as such will also depend upon the requirements of the particular application for which the joined objects are to be used. For example, if a water-tight seal is required, as in a container, then a circumferential seal is necessary. If two solid bodies are to be joined and the joint between is to be of a known fatigue limit, but not water-tight, then a series of tack welds might suffice.

In certain instances, it might be desirable to forego the speed of the operation and thereby obtain an ultrasonic sealing unit that requires a lower power input. In this manner, it is possible to save on the initial expense of both the ultrasonic transducer and the generator required to power the transducer.

When a sealing tool in the form of a ring is used, it will have a specific amplitude of vibration when vibrated in an undamped condition. When the portions of the container to be joined are brought in contact with the sealing surface of the ring vibrator, there will be either a dropping off of amplitude due to the pressure placed upon the surface of the ring by the container, or if there is an automatic frequency control and an automatic power control, there will be a compensation within the unit so as to maintain a constant amplitude of vibration at the sealing surface of the vibratory tool that is used. It stands ot reason that, if the entire circumference of the tool is to be utilized at one time, then the amount of power required to maintain said tool at a given amplitude must be greater than if only a portion of the sealing surface is used. It is possible, if a minimum contact between the output surface of the pressure tool and the circumference of the container is maintained, to complete a seal at a reduced power requirement. Therefore, if we utilize the point sealing technique in combination with an ultrasonically vibrating ring, it is possible to reduce the power required by the generator into the vibratory motor.

The tools illustrated in FIGS. 7 through 13 are various embodiments of obtaining joining by the use of ultrasonic energy at a reduced power level. This is most important in view of the high cost of obtaining ultrasonic energy because of the cost of the generator.

If a roller is used as the disk member and said roller is rotated so as to maintain a pressure at a point tangent to its circumference, then the entire surfaces to be joined may be sealed by the mere rotation of one or more circular rollers. In this manner, a lesser amount of power is required to maintain the desired amplitude of vibration than is required to obtain a complete peripheral seal at one time.

Figure 7:
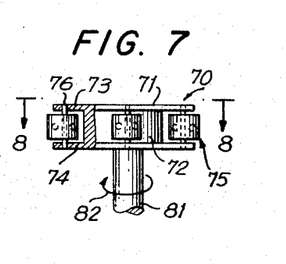
FIG. 7 is an elevational view illustrating another type of support member suitable for use in the apparatus of FIG. 1.
Figure 8:
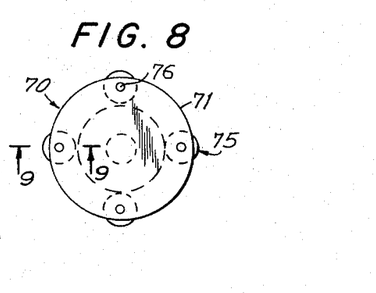
FIG. 8 is a top plan view of the support member, which view is taken along the line 8—8 of FIG. 7.
Figure 9:
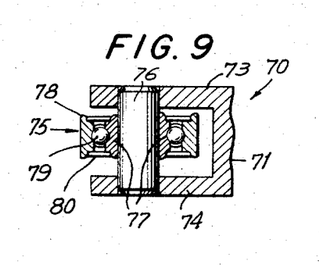
FIG. 9 is an enlarged sectional view illustrating in detail the construction of the support member, which view is taken along the line 9—9 of FIG. 8.
Figure 10:
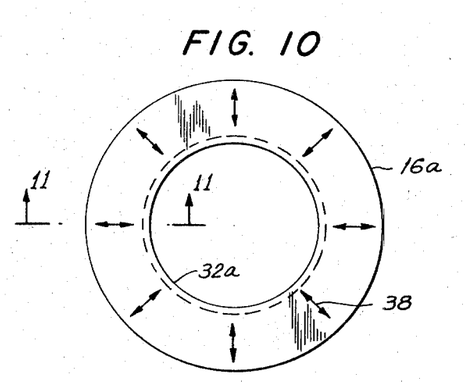
FIG. 10 is a plan view of a sealing ring for use in ultrasonic sealing devices embodying this invention, and having a pattern of grooves in the sealing surface thereof.

One type of lower support mechanism that may be used with the sealing equipment is illustrated in FIGS. 7, 8 and 9. As opposed to the radially expandable collets 63 illustrated in FIGS. 5 and 6, the support and pressure tool 70 has a fixed outer diameter and includes a circular support member 71 having a peripheral groove 72 to form a pair of upper and lower flanges 73 and 74, respectively. Rotatably moving pressure members are secured to and extend from the periphery of said support member, for example, by four equally, angularly spaced apart ball-bearing rollers 75 which rotate freely during the sealing operation.

It is to be observed, more particularly from FIG. 9, that the rollers 75 are secured to the flanges 73 and 74 by means of dowel pins 76. In addition, each dowel 76 rigidly secures the inner race 77 of the rollers 75 in position and are located equi-distant from the axis of the support member 71, so that the outer race 78 of the rollers 75, supported thereby, project evenly beyond the circumferential surface of the support member 71. Also the roller races 78 are freely sustained by balls 79 in place by conventional retainers 80. The entire assembly 70 is supported by shaft 81 which, when rotated (by means not shown) in the direction of arrow 82, causes all the rollers 75 to independently rotate when in contact with the surfaces to be sealed.

The inner and outer sealing surfaces 32 and 33 respectively of the radially vibrated ring 16 may be formed with grooves which extend either substantially parallel or at right angles to the directions of radial vibrations. Thus, as shown on FIGS. 10 and 11, the sealing surface 32a of ring 16a may be formed with concentric circular grooves 84 which, at all points therealong, extend parallel to the directions of the radial vibrations indicated by arrows 38. Alternatively, the grooves in the sealing surface may be in the form of concentric square grooves, as at 84a on the sealing surface 32b on ring 16b of FIG. 12. The grooves in the sealing surface may also be in the form of a continuous spiral, or the grooves may be arranged to form a grid shaped square tooth pattern or any other desired contour.

Figure 11:
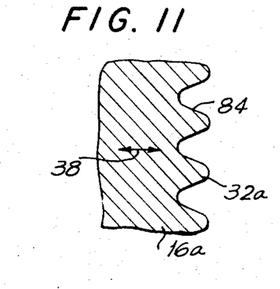
FIG. 11 is a greatly enlarged sectional view illustrating the cross-sectional shape of grooves that are formed in the sealing surface of the vibrated sealing ring, which view is taken along the line 11—11 on FIG. 10.
Figure 12:
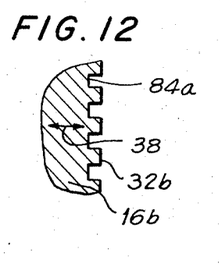
FIG. 12 is a view similar to that of FIG. 11, but showing another form of pattern.

The grooves as arranged in the patterns of FIGS. 11 and 12 may be formed on the inner and/or outer sealing surfaces 32 and 33 respectively, wherein they extend at substantial angles to the directions of the radial vibrations. Thus as shown on FIG. 13, the inner sealing surface 32c of ring 16c may be formed with concentric circular grooves 84c which, at all points therealong, extend at right angles to the directions of the radial vibrations indicated by arrows 38.

The purpose of the desired grooves formed in the sealing surfaces of the radially vibrating rings 16a, 16b and 16c is to reduce the surface area of the sealing surface in contact with one of the members to be joined. By reducing the surface area, it is possible to minimize the power required to join two members and in turn reduce the size of the transducer and generator equipment required. This results in a direct cost savings to the user on the ultrasonic equipment. Further, the grooves of the sealing surface serve to ensure the transmission of the high frequency or ultrasonic radial vibrations to the members to be joined irrespective of surface irregularities and misalignment of the container and the annular sealing surface.

It is generally known that in joining operations a static force is required to be maintained, between the members, at the surfaces to be joined. This static force assures a proper coupling of the energy transmitted to the surfaces. It has been found that, when a tool is used having relief grooves and simultaneously vibrated at high or ultrasonic frequencies, the sealing occurs at a reduced power level as well as static pressure. The high frequency radial vibrations cause a flowage of the materials to be joined into the groove depressions while compacting the material in contact with the high points or surfaces of the grooves to assure a proper coupling for the transmission of the vibratory energy. Thus, the pressure as well as power can be reduced when the grooved sealing surface is provided.

The method of joining thermoplastic materials hereinabove described is not limited to relatively thin members. Both members to be joined may have a substantial thickness in the plane perpendicular to the plane of radial vibration of the sealing ring 16, or any combination of relatively thin and thick material may also be selected. As shown in FIG. 13, two solid members are being joined by the vibratory energy of the sealing ring 16c. The inner member 86 is shown having a rectangular cross section and the outer member 87 has a circular cross section with a rectangular hole to accommodate the inner member 86. The basic criteria that must be followed is that the outer member, in this case, 87, should have a substantial cylindrical surface to assure sufficient energy transmission to the interface of the members 86 and 87 in their surface area of contact.

By utilizing a grooved sealing surface, the area of contact with the ring vibrator is minimized. The vibratory waves pass through the outer member 86 and cause the energy to heat and in turn fuse the mating surfaces of inner member 86 and outer member 87.

The prior embodiments of the present invention have illustrated the use of a radially vibrating ring wherein its inner surface has been utilized for the sealing process. Referring now to FIGS. 14 and 15, it will be seen that the entire outer surface of a radially vibrating tool may also be utilized for the joining of thermoplastic materials.

The source of the radially vibratory motion to be imparted to the container during the fabrication process may be in the form of a radial vibrator as disclosed in detail in U.S. Letters Patent No. 3,139,543, titled, Magnification of the Amplitude of Magnetostrictive Radial Vibrations, and assigned to the present assignee, or a radial vibrator of any other design.

FIG. 14 generally illustrates one station in the fabrication of a container 90 in which the closure 92 is joined to the body 91. A support means 93 may be mounted on a suitable frame structure 94 and comprises a block 95 having a generally frusto-conical cavity 96 with an annular shoulder 97 which serves to support the container 90. The sequential operation in the joining of the overlapped portions of the body 91 and closure 92 in general comprises the positioning of container 90 on mandrel 98 and inserting the latter with the container thereon into the cavity 96 as illustrated in FIG. 14.

The tool for producing radially directed vibrations as identified by the reference numeral 100, includes a body 101 of circular configuration which may be brazed, soldered or otherwise secured on a supporting shaft 102. In order to permit raising and lowering of the tool 100 and rotation thereof, shaft 102 may be supported at its end in a suitable support mechanism (not shown).

The body 101 may be formed of magnetostrictive material so that said body will vibrate radially (FIG. 15) to a maximum degree when subjected to the influence of an alternating electromagnetic field established by the supplying of biased alternating current to windings 103 provided directly on the body 101.

The body 101 may be formed of an axial series of generally circular laminations 104 fabricated from magnetostrictive metal and formed with generally radially extending slots, as at 105 on FIG. 15, so as to divide each lamination 104 into a circular series of sector-shaped portions 106 and 107.

The energizing windings 103 are wound around the relatively narrow stems of the sectors 107 of small mass of a group or stack of the laminations 104 which are axially superposed, so that the high frequency alternating electromagnetic field established by the passage of a biased, suitable high frequency alternating current through the windings 103 induces or generates radially directed vibrations in the sectors 107 at the fundamental mode of radial vibration of the body 101.

Since the desired radial vibrations of magnified amplitude occur at the outer ends of the sectors 107 of relatively small mass, the outer ends of the narrow stems constituting the major portion of the sectors 107 may be provided with circumferential enlargements, as at 108, so that the desired radial vibrations of magnified amplitude will be available over the substantial peripheral portions of the body 101 constituted by the arcuate outer edges of the circumferential enlargements 108.

When the tool 100 is in the form of a rotatable transducer, as illustrated in FIG. 15, the biased, high frequency alternating current may be supplied to the energizing or exciting windings 103 through slip rings 109 (FIG. 14) carried on shaft 102 and being connected by suitable conductor (not shown) to the windings 103 and wherein the slip rings 109 are connected to a suitable conventional generator or other source of the necessary biased, high frequency alternating current (not shown).

The radial vibrations generated in the body 101 as indicated by arrows 110 may be transmitted to a radial ring 111 which may be brazed, soldered or otherwise secured to the circumferential enlargements 108 and such radial vibrations are effectively transmitted through the ring 111 so that the outer or annular sealing surface of the latter is radially vibrated with a substantial amplitude at the desired high or ultrasonic frequency.

Depending upon the diameter and thickness of the ring 111, the area adjacent the circumferential enlargement 108 might vibrate at a greater amplitude than a similar portion of said ring adjacent a sector 106 of the body 111. When this occurs, the entire tool 100 may be rotated as it is brought in contact with the overlapped area of the container body and bottom to be joined.

In the alternative the radial vibrator as illustrated in FIG. 15 may consist of only a series of sectors of the relatively narrow stems thereby avoiding the requirement of a rotating transducer.

In actual practice, the entire tool 100 is raised (by means not shown) into engagement with the closure 92 of container 90 for a time sufficient to permit the seal to take place. The tool 100 is then lowered until the next container is positioned and the sealing operation is repeated. The container 90, as illustrated in FIG. 14, has an extended annular lip 99 which will be rolled over at the next work station in the cup fabrication process.

It will be appreciated that the essence of the present invention consists in applying high frequency, minute amplitude vibrations with a major component substantially perpendicular to the surfaces to be joined. In addition, at least one of said materials is of a thermo softening material, thereby permitting the vibratory energy transmitted thereto to soften the materials at their interface and then coalesce to form a rigid bond therebetween. From the foregoing, it is apparent that an ultrasonically vibrating ring may be used on either its inner or outer circumference to perform the joining operation.

The above described ultrasonic equipment may be utilized to join two members irrespective of their configuration. The only criterion which is of importance is that one of said members, preferably the outer member to be joined, has a cylindrical surface or a sufficient number of points on its circumference capable of being in contact with the inner or outer surface of the radially vibrating ring during the joining operation. Thus, by the process herein disclosed, it is possible to join a member having merely several points on its circumference capable of contact with, for example, the inner circumference of the annular tool member and said member having a hollow therethrough for positioning therein a second member to be joined to the outer member. In this manner, it is possible to transmit the longitudinal vibrations from the surface of the annular ring to the surfaces between the two members to be joined.

The inner bore of the outer member may have numerous shapes. For example, it is possible to join an outer member which is of a rectangular configuration to a circular member positioned within a bore of said outer member. In this type of sealing operation, we obtain spot seals in the area directly adjacent the portion of the outer member that is in contact with the surface of the vibrating ring.

By the use of the radially vibrating ring, it is possible to obtain compressional waves transmitted to the thermo softening materials at the surfaces to be joined irrespective of the diameter of the outer member. In this manner, the vibratory energy is maintained in a direction in which we have compressional waves rather than sheer waves which are not as desirable when joining thermoplastic materials in the plastic family.

Although most of the embodiments of the present invention described above illustrate the use of the method of this invention in the fabrication of containers, it is important to note that the type of vibrator may be varied for any other application to which the present invention is capable of solving the joining problem. For example, two tubular members may be joined by the process of the persent invention by merely having a portion of the two tubular members in overlapping relationship to each other. Thus, the scope of the present invention is not necessarily limited to the fabrication of containers as such, and may be utilized for a variety of joining operations heretofore impracticable in view of the configurations of the members to be joined. This invention makes it possible to join two members either one or both of which may be in sheet form or of a rigid thermoplastic material.

Although illustrative embodiments of the invention have been described in detail herein with reference accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. A method of joining thermoplastic members, at least one of which has a cylindrical surface, comprising the steps of
    (A) positioning at least a portion of said members in overlapping contacting relationship to form an area of overlap in which they are to be joined,
    (B) maintaining the overlapping surfaces of said members in contact with each other in said area, and
    (C) applying high frequency radial forces recurring at an ultrasonic rate to the cylindrical surface of one of said members to effect their joinder in said area of overlap.

2. A method as in claim 1;
    wherein the members are in sheet form and said high frequency radial forces being applied are substantially normal to the surfaces of the members in their area of overlap.

3. A method as in claim 1;
    wherein the members are normally solid bodies and said high frequency radial forces being applied are substantially normal to the surfaces of the members in the area of said overlap.

4. A method of joining two members having annular surfaces, at least one of which is thermoplastic, comprising the steps of
    (A) positioning at least a portion of the annular surfaces of said members in overlapping relationship with each other to form an area of overlap,
    (B) maintaining a radially directed force to retain the annular surfaces in contact with each other in their area of overlap, and
    (C) applying high frequency radial vibrations, recurring at an ultrasonic rate circumferentially to one of said members along the area of overlap and wherein said radial vibrations are applied substantially normal to said annular surfaces.

5. A method of joining two members, at least one of which is thermoplastic, including a container body having an annular section and to closure having an annular peripheral flange, comprising the steps of
    (A) positioning the annular peripheral flange of the closure in interfitting relationship with the annular section of the body to provide an overlapped joining area between said body and closure, (B) disposing the overlapped area within a radial vibrator having an annular surface for complete engagement with the outer peripheral surface of said body, said annular surface lying in a common plane substantially normal to the axis of the container body, and (C) generating high frequency radial vibrations in said vibrator to act at said overlapped area to effect the joinder of said body to said closure.

6. A method of joining two members, at least one of which is thermoplastic, including a container body having an annular section and a closure having an annular peripheral flange, comprising the steps of (A) inserting the annular peripheral flange of said closure within said body to provide an annular overlapped joining area between said body and closure, (B) positioning the overlapped annular area within a radial vibrator having an inner annular surface for complete engagement with the outer peripheral surface of said body, said annular surface lying in a common plane substantially normal to the axis of the container body, (C) inserting a support tool within the closure portion of said container to provide radially outward pressure to expand the portion of the body and closure in the annular overlapped area to establish pressural contact between the surface areas to be joined and the surface of the body in contact with the radial vibrator to ensure proper transmission to the high frequency vibrations, and (D) generating high frequency radial vibrations in said vibrator to act at said outer periphery to effect the joinder of said body to said closure in the annular overlapped area.

7. A method of joining two members, at least one of which is thermoplastic, including a container body having an annular section and a closure having an annular peripheral flange, comprising the steps of (A) inserting the annular peripheral flange of said closure within said body to provide an annular overlapped joining area between said body and the peripheral flange of said closure, (B) positioning the overlapped annular area within a radial vibrator which encompasses the outer periphery of said body, (C) providing an expanding tool capable of having a diameter greater than the internal diameter of the annular peripheral flange of said closure, (D) advancing the expanding tool axially into the portion of the closure in overlapping relationship with the container body to establish contact between the annular surface areas to be joined and the peripheral area of said body in contact with the radial vibrator, and (E) generating high frequency radial vibrations in said vibrator in a plane substantially perpendicular to the surface areas to be joined thereby providing a sealing cycle so as to effect the joinder of said body to said closure in the overlapped area.

8. A method as in claim 7;

wherein said expanding tool is rotated during the sealing cycle and has a plurality of rollers extending circumferentially thereof so that the annular overlapped portions of the container are joined together along a seam extending parallel to the surface of said rollers.

9. A method as in claim 7;

wherein said expanding tool is rotated during the sealing cycle and has a variable diameter that may be adjusted during said cycle.

10. A method of joining two members, at least one of which is thermoplastic, including a container body having an annular section and a closure having an annular peripheral flange, comprising the steps of (A) supporting the closure and body on a mandrel to provide an overlapped annular joining area between said body and the peripheral flange of said closure, (B) inserting a support tool within the closure portion of said container to provide radially outward pressure to maintain the annular portion of the body and closure in the overlapped area to be joined in contact with each other, (C) positioning the overlapped annular area of said body and closure to be joined within a radial vibrator and wherein the peripheral surface of said body is mainaained under pressure with said vibrator by means of said support tool, and (D) generating high frequency radial vibrations in said vibrator to act at the peripheral area to effect the joinder of said body to said closure in the overlapped area.

11. A method of joining two members, at least one of which is thermoplastic, including a container body having an annular section and a closure having an annular peripheral flange, comprising the steps of (A) positioning the annular peripheral flange of said closure in interfitting relationship with said body to provide an annular overlapped joining area between said body and the peripheral flange of said closure, (B) providing a radial vibrator having an annular sealing surface, said annular surface lying in a plane substntially normal to the axis of the container body, (C) advancing the radial vibrator axially to engage said annular sealing surface with a portion of said closure in its area of overlap with the container body, and (D) generating high frequency radial vibrations in said annular sealing surface in a plane substantially perpendicular to the surface areas to be joined so as to effect the joinder of said body to said closure in the annular overlapped area.

12. Apparatus for joining together members having an overlapping area therebetween and at least one of which is thermoplastic, comprising (A) a circular ring having an annular sealing surface, (B) vibration generating means coupled to said ring to effect radial vibration of the latter at a high frequency, and (C) means for positioning the overlapping area of the members to be joined in contact with the circular ring, wherein at least one of said members is in substantially complete physical engagement with the annular sealing surface of said ring so that said high frequency vibrations cause the members to be joined in their overlapping area.

13. Apparatus for joining together members having an overlapping area therebetween and at least one of which is thermoplastic, comprising (A) a circular ring having an annular inner sealing surface, (B) vibration generating means coupled to said ring to effect radial vibration of the latter at a high frequency in the plane substantially normal to said annular surface, (C) means for retaining the overlapping surfaces of said members in contact with each other, and (D) means for bringing one of said members in contact with the annular inner sealing surface of said ring in the overlapping region so that said high frequency vibrations cause the members to be joined in the region of overlap.

14. Apparatus for joining together members having an overlapping area therebetween and at least one of which is thermoplastic, comprising (A) means generating high frequency, longitudinal vibrations, (B) a circular ring having an inner sealing surface and being coupled to said generating means to radially receive said longitudinal vibrations from the latter so that the sealing surface of said ring is made to vibrate radially at said high frequency, said sealing surface having grooves therein which extend at least in part at substantial angles to the directions of the radial vibrations, (C) means for retaining the overlapping surface of said members in contact with each other, and (D) means for positioning one of said members in contact with the inner sealing surface of said ring in the overlapping region so that said high frequency vibrations cause the members to be joined in the region of overlap.

15. Apparatus as in claim 14; wherein each of said grooves extend, at least in part, parallel to the direction of the radial vibrations.

16. Apparatus as in claim 14; wherein said grooves extend circumferentially on the sealing surface of said ring.

17. Apparatus as in claim 14; wherein said grooves extend circumferentially on the sealing surface in a square tooth shaped pattern.

18. Apparatus for joining together the overlapping surfaces of two members, at least one of which is thermoplastic, including a container body having an annular surface and a closure having an annular peripheral flange, comprising (A) a circular ring having an inner sealing surface, (B) vibration generating means coupled to said ring to effect radial vibration of the latter at a high frequency, (C) a support mandrel in axial alignment with the inner sealing surface of said ring and adapted to hold the annular surface of said body and closure in overlapping relationship, and (D) means effecting relative movement of said mandrel with said ring so as to urge the body of said container into engagement with the radially vibrating sealing surface of said ring in the area of said overlap to obtain a joining therebetween.

19. Apparatus for joining together the overlapping surfaces of a container body having an annular surface to a closure having an annular peripheral flange as in claim 18, further comprising means to disengage said container from contact with said sealing surface upon completion of the sealing cycle.

20. Apparatus for joining together the overlapping surfaces of two members, at least one of which is thermoplastic, including a container body having an annular surface and a closure having an annular peripheral flange, comprising (A) a circular ring having an inner sealing surface, said surface lying in a plane substantially normal to the axis of the container body, (B) vibrating generating means coupled to said ring to effect radial vibration of the latter at a high frequency, (C) a support mandrel in axial alignment with the inner sealing surface of said ring and adapted to hold the annular surfaces of said body and closure in overlapping relationship, (D) support means in axial alignment with said support mandrel adapted to engage said closure flange in the area of said overlap, and (E) means for effecting relative displacement of the support mandrel and support means so as to urge the annular overlapping surfaces of said container into engagement with the radially vibrating sealing surface of said ring in the area of said overlap to effectuate a joining of said annular overlapping surfaces.

21. Apparatus as in claim 20; wherein said support comprises (A) a support structure rotated coaxially with the center of said sealing ring, (B) a plurality of rollers circumferentially spaced from the axis of said support structure, and (C) mounting means connecting said rollers to said support structure with said rollers being free to rotate about its center and having the latter spaced radially from the axis of said support structure.

22. Apparatus for joining together the overlapping surfaces of two members, at least one of which is thermoplastic, including a container body having an annular surface and a closure having an annular peripheral flange, comprising (A) back-up means for maintaining the annular overlapped surfaces of said body and closure in engagement with each other, (B) a vibrator mounted in coaxial alignment with the back-up means and designed to have a radially vibrating surface in the plane substantially perpendicular to the overlapped surfaces, and (C) means operative to displace said back-up means and vibrator toward each other to exert a clamping pressure on said overlapped surfaces engaged between the radially vibrating surface of said vibrator and back-up means, so that elastic vibratory energy is introduced in the region of said overlap to join together the engaged surfaces.

References Cited

UNITED STATES PATENTS

| | | | |
|---|---|---|---|
| 3,224,915 | 12/1965 | Balamuth et al. | 156—73 |
| 3,093,937 | 6/1963 | Balamuth et al. | |
| 3,017,792 | 1/1962 | Elmore et al. | 29—470.1 |
| 3,088,343 | 5/1963 | Balamuth et al. | 29—470.1 XR |

PHILIP DIER, *Primary Examiner.*

U.S. Cl. X.R.

29—470.1; 156—73, 306, 580; 228—1